July 9, 1968 J. L. DE BOO 3,392,237

PRINTING TELEGRAPH TAPE READER

Filed April 8, 1964

INVENTOR
JEROME L. DeBOO

BY R. C. Perry

ATTORNEY

United States Patent Office 3,392,237
Patented July 9, 1968

3,392,237

PRINTING TELEGRAPH TAPE READER

Jerome L. De Boo, Barrington, Ill., assignor to Teletype Corporation, Skokie, Ill., a corporation of Delaware Filed Apr. 8, 1964, Ser. No. 358,285
10 Claims. (Cl. 178—17)

ABSTRACT OF THE DISCLOSURE

A document reader including a tape deck having a plurality of holes formed through it, a ferromagnetic tape lid positioned over the holes in the tape deck, a pair of permanent magnets for urging the tape lid toward the tape deck, an insulating block positioned below the tape deck, a plurality of yieldable wire spring document sensing members extending from the insulating block in cantilever fashion into the holes in the tape deck, a plurality of humped-shaped camming members each positioned on one of the document sensing members in a hole in the tape deck, a common contact member positioned for engagement with the document sensing members approximately midway between the insulating block and the camming members, a rigid bar extending from the insulating block for supporting the common contact, and a contact cleaning circuit for preventing contaminants from accumulating between the document sensing members and the common contact including a power source, a load resistor connected in series with the power source, the common contact and the document sensing members, a capacitor and a second resistor of lower impedance than the load resistor connected in series with each other and in parallel with the common contact member and the document sensing members and with the load resistor and the power source.

This invention relates to telegraph tape readers and more particularly to tape readers for reading either chadless or fully perforated tape.

The most common method of reading perforated tape is the method which utilizes reciprocable sensing pins which detect the presence or absence of perforations in the tape. The sensing pins which find perforations pass through the perforations and close electrical contacts, or a sensing pin fails to move through the tape by striking an unperforated portion of tape and fails to close its associated contact. The sensing pin must then be retracted and the tape advanced to the next character location. This method of sensing tape imposes severe speed limitations on today's high speed tape readers. Another method which lends itself to high speed tape sensing is the use of wire brushes which bear against the tape and pass through perforations in the tape to make contact with a plate or roller on the other side of the tape. With the tape passing between the mating contacts, lint and other contaminants, although deposited around the area of actual contact, are continuously wiped away by the action of the moving tape. Although this method lends itself to high speed it is incapable of reading chadless tape of the type disclosed in Patent No. 2,255,794, granted to R. A. Lake on Sept. 16, 1941, which tape is in general use in the communications industry today. Chadless tape contains only partially-cut perforations which can be moved by a pin or stylus entering the perforation, but the lids of these partially-cut perforations prevent the wire brushes from making electrical contact through the perforation.

It is an object of the present invention to provide tape reading mechanism to read both fully perforated and chadless tape at high speeds.

It is also an object of this invention to provide mechanism to read chadless and fully perforated tape without oscillating sensing pins through perforations in the tape and without making electrical contacts through perforations in the tape.

Another object of the present invention is to keep contaminants from the tape out of the area of the electrical contacts in a perforated-tape reader.

In the sensing of perforated tape by slight motions of mechanical sensors entering the perforations in the tape, the tape must be confined and movement of the tape in the direction perpendicular to its length must be restricted to prevent false reading. Therefore, it is a further object of the invention to guide tape in a confined path with a minimum of clearance for tape movement out of the path of tape advance.

In accordance with one embodiment of the invention a conductive plate is mounted on an insulating base, a metallic brush is mounted obliquely on the base and is biased to extend past and contact an edge of the conductive plate. A tape lid is magnetically urged down toward the conductive plate to define an opening between the lid and the plate. When tape is fed through the opening, imperforate areas of it deflect the metallic brush out of contact with the plate. Perforations in the tape permit the deflection of the brush into the perforation to make contact with the edge of the plate. A blower directs air past the brush and through the perforations in the tape in order to keep lint on the opposite side of the tape from the area of contact between the brush and the plate. Upon contact of the brush with the plate, a capacitor is discharged through the brush and the conductive plate to burn any lint that might be deposited between the plate and brush.

In accordance with another embodiment of the invention, a conductive plate is mounted substantially parallel with a metallic wire. Both the wire and the plate extend obliquely toward the tape with the end of the wire engaging the bottom of the tape. The end of the wire is shaped to permit camming movement of the wire by the edge of a perforation in the tape independent of the direction of tape movement. The shaped end of the wire is biased into engagement with the tape and upon movement into a hole in the tape, the wire makes contact with a common electrical terminal on the plate.

A complete understanding of the invention may be had by reference to the following detailed description considered in conjunction with the accompanying drawings wherein.

Figure 1:
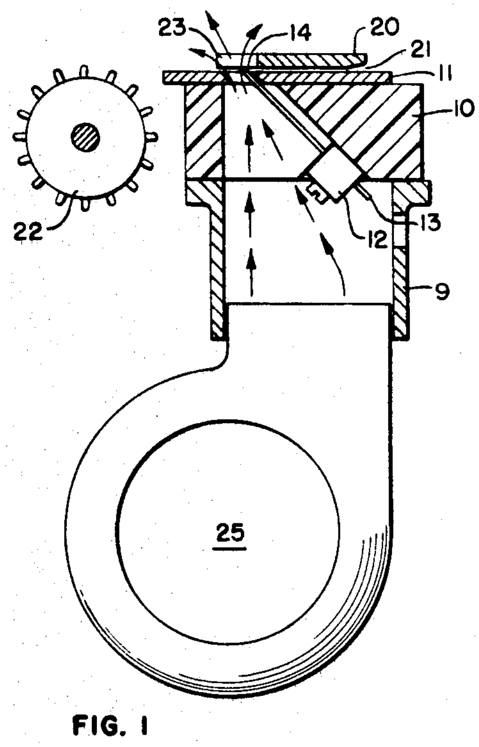
FIG. 1 shows a perforated tape reader with a blower blowing air past the contact to keep lint above the tape contact location.

As shown in the drawings, particular reference being had to FIG. 1, a conductive plate 11 is mounted on a base of insulating material 10 mounted on a support 9. A holder 12, also made of insulating material, is mounted on base 10 and holds a plurality of metallic brushes 13 which extend through the holder 12 and project slightly beyond conductive plate 11. The brushes 13 are biased toward conductive plate 11, and all extend beyond conductive plate 11 to sense the presence or absence of perforations across the width of a telegraph tape. Each metallic brush 13 may comprise any suitable number of wires, but ten wires has been found to be a practical upper limit. The end 14 of each metallic brush 13 which extends beyond conductive plate 11 functions as a stylus which drags along the bottom of the tape and springs into holes in the tape to make contact with the conductive plate 11 when a perforation is sensed in the tape.

A tape lid 20 (FIG. 1) extends across the conductive plate 11 and defines a slot 21 between the bottom of tape lid 20 and the top of conductive plate 11. Perforated tape may be passed through slot 21 from right to left when urged by feed roller 22, and the tape is closely confined within the slot 21 as it passes through the tape reader. An imperforate portion of the tape passing over stylus 14 exerts sufficient downward force on stylus 14 to deflect brush 13 to the left and down (FIG. 1) away from conductive plate 11. When a perforation in the tape passes over end or stylus 14, the stylus springs upward and to the right into the perforation and brush 13 makes electrical contact with conductive plate 11. Openings 23 are provided in the tape lid 20 to accommodate the stylus 14 of each brush 13 when it passes through a perforation in the tape. As the tape progresses to the left, the trailing edge of the perforation again bears against end or stylus 14 and deflects brush 13 out of contact with conductive plate 11 and stylus 14 then drags along the bottom of the tape until the next perforation passes over stylus 14.

Since the end of the sensing brush 13 enters the tape from the same side on which it makes electrical contact, the presence of a lid over the perforation has no effect upon the reader except to dampen bouncing of the brush. This permits the reader to sense either chadless or fully perforated telegraph tape at high speed.

With stylus 14 dragging along the bottom of the paper tape, it is inevitable that some lint will break loose from the paper and collect around stylus 14 and progress down wire 13 toward the contact area between brush 13 and conductive plate 11. To impede the downward movement of this lint into the area of contact, a blower 25 is mounted beneath the tape reader and blows air upwardly in the direction of the arrows. This updraft urges the lint towards the tape and out of the area of contact between the brush 13 and conductive plate 11 and tends to keep the lint from accumulating below the tape. It has been found that with this blower 25 lint will accumulate on top of the moving tape and accumulations of lint will from time to time be carried off with the moving tape.

Figure 2:
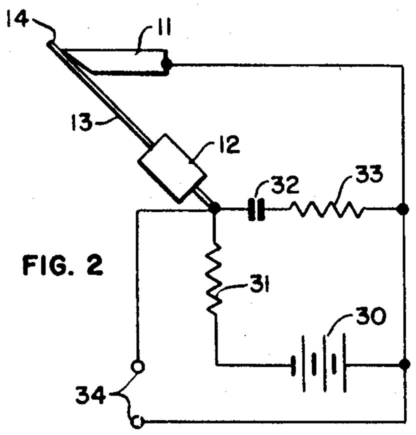
FIG. 2 is a circuit diagram showing the tape sensing contact connected in the capacitor discharge circuit.

The conductive plate 11 and metallic brush 13 (FIG. 2) are connected in series with an electrical circuit consisting of a power source 30 and a load resistor 31. When the tape-sensing contact is closed upon encountering a perforation in the tape, substantially no voltage will appear across output terminals 34 because the tape-sensing contacts shunt terminals 34. When the tape sensing contact is open, however, the voltage of power source 30 will appear cross output terminals 34. In addition, a capacitor 32 and a resistor 33 of very low resistance are connected in series and placed across the tape-sensing contact. Whenever the tape sensing contact between metallic brush 13 and conductive plate 11 is open, capacitor 32 charges to substantially the voltage of power source 30 through resistors 31 and 33. Immediately upon closure of the tape sensing contact, when stylus 14 enters a perforation in the tape, capacitor 32 discharges through the tape sensing contacts and resistor 33. Since resistor 33 presents considerably less resistance in the path of discharging capacitor 32 than load resistor 31 places in the path of power source 30, the amount of current which passes through the tape sensing contact immediately upon contact closure is considerably higher than that which passes through load resistor 31 after capacitor 32 has been completely discharged. The RC circuit formed by capacitor 31 and its series resistor 33, in passing a very large amount of current for a very short time which is determined by the capacitance of capacitor 32 and the very low resistance of resistor 33, appears to burn or eradicate lint and other contaminants which ordinarily collect in the tape sensing contact. As an example of the magnitudes involved, the tape sensing contact is normally closed, by the end 14 entering a perforation in the tape, for approximately a millisecond at the tape sensing speeds at which this transmitter preferably operates, however, the discharge time of capacitor 32, approximately the RC time constant of capacitor 32 and resistor 33, seldom exceeds five microseconds. In the normal operation of this tape transmitter one to three milliamperes is passed through the load resistor 31 during the closure of the tape sensing contacts whereas upon the discharge of capacitor 32, a peak current of as much as one ampere may flow through the tape sensing contacts. Such a high current, if passed through the tape sensing contacts during the entire closure of the contacts, would greatly reduce useful contact life. In addition, capacitor 32, when connected across the tape sensing contacts, performs an integrating function since it is well known that most contacts experience a certain period of bounce immediately upon "making." This bounce or chatter can be effectively masked by proper selection of the values of capacitor 32 and load resistor 31. Each individual brush 13 across the width of plate 11 has associated with it an individual load resistor 31 connected to the power source 30 and has an individual capacitor 32 and resistor 33.

Figure 3:
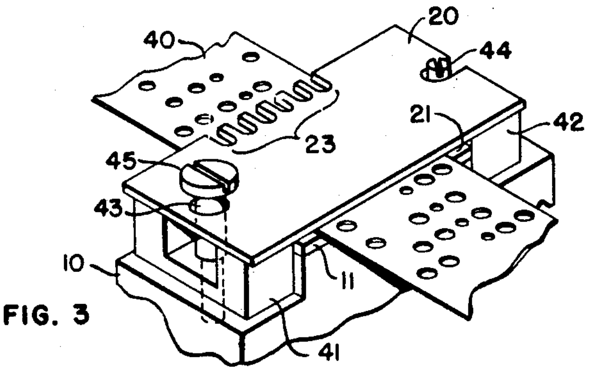
FIG. 3 shows a ferromagnetic tape lid bearing against the tape and biased by permanent magnets.

In a high-speed machine, it is imperative that masses, speeds, and distances moved be kept to a minimum. For this reason, it is desirable to move stylus 14 as short a distance as possible to sense the presence of a perforation in the tape; therefore, slot 21 must be closely restricted to provide as little clearance as practicable for the vertical movement of the tape as viewed in FIG. 1. In order to reduce the available clearance for the movement of the tape in slot 21 and yet not cause the tape to bind in slot 21 due to normal variations in tape thickness, the tape lid 20 (FIG. 3) is made of ferromagnetic material and is urged toward conductive plate 11 by two permanent magnets 41 and 42. A section of tape 40 is shown in place in slot 21 between conductive plate 11 and tape lid 20. Permanent magnet 41 is held onto base 10 by a shoulder screw 43 which has a head 45 and which serves as a loose pivot for tape lid 20. Magnet 42 is held in place by another shoulder screw 44 which does not have a head 45. Thus, the tape lid 20 can be rocked off of screw 44 and rotated around shoulder screw 43 to facilitate threading of tape 40 through the reader. When the tape is in place, the tape lid is rotated around screw 43 back into position over the tape 40 and lowered onto magnets 41 and 42. Without tape in the slot 21 the clearance between plate 11 and lid 20 is less than the normal thickness of the tape 40. Thus, with the tape in place, a slight air gap exists between each of the magnets 41 and 42 and the lid 20; therefore, the tape 40 is gently squeezed between plate 11 and tape lid 20.

Figure 4:
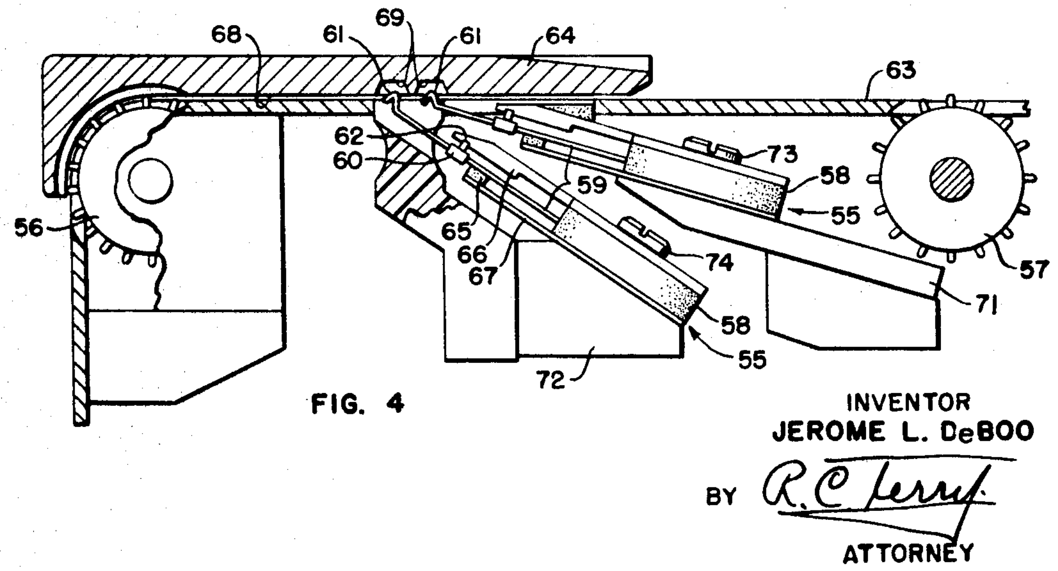
FIG. 4 shows the other embodiment of the invention having two sets of tape reading contacts arranged to read adjacent character-representing rows of perforations in the tape.

Another embodiment of the invention is illustrated in FIG. 4 wherein mechanism is provided for reading perforated tape being fed in either of two directions through the reader and also for simultaneously reading adjacent or succeeding rows of perforations in the tape. This latter feature is provided to facilitate error detection operations by reading the same set of perforations twice in immediate succession. In the apparatus in FIG. 4, a pair of reader assemblages 55 is provided for reading adjacent rows of perforations in the tape. The tape may be fed past these assemblages by driving either a feed roller 56 or a feed roller 57, one of the rollers being disabled when the other one is operative to feed the tape whereby rotation of the feed roller 56 in a counterclockwise direction will feed tape from right to left as viewed in FIG. 4 while the roller 57 is disconnected from its driving mechanism. Conversely, the feed roller 57 may be rotated in a clockwise direction to feed the tape from left to right while the feed roller 56 is in a "free wheeling" condition, disconnected from its driving mechanism.

The reader assemblages 55 and feed rollers 56 and 57 are suitably mounted in a supporting structure and driven by any suitable mechanism, not shown. The assemblages 55 are both of the same construction and each comprises an insulator 58 in which there is mounted a plurality of contact springs 59. The contact springs 59 carry precious-metal contacts 60 intermediate the free end of each spring 59 and the insulator 58 in which the row of springs 59 is mounted. The free ends of the springs 59 are bent as shown at 61 to present camming surfaces to perforations in the tape such that, the tape in being fed either to the right or to the left will cam the springs 59 downwardly and to the left to disengage the precious-metal contacts 60 from a common contact bar 62 when the bent ends 61 of the springs 59 are in engagement with imperforate areas of a tape being fed by either of the feed rollers 56 and 57 over a tape plate 63 and under a tape lid 64. The assemblages 55 each include a nonresilient backing plate 66 on which the common contact member 62 is mounted, and each of the assemblages also include a series of backing springs 67 each of which has a rubber vibration damper 65 which lighty touches the springs 59 and against which the springs 59 may be moved when the ends 61 thereof are in engagement with imperforate sections of the tape. The tape lid 64 is mounted above the tape plate 63 and has a slot 68 formed in it through which tape may be fed upon operation of either the tape feed roller 56 or tape feed roller 57. At the area of the tape lid 64 where the ends 61 of the springs 59 are positioned, when the assemblages 55 are mounted in the apparatus, the tape lid is provided with transversely-extending grooves 69 into which the upper portions of the ends 61 may enter without contacting the tape lid 64 when the ends 61 encounter apertures in the tape.

Each of the assemblages 55 has a backing plate 66 mounted on it together with a series of associated springs 59 and 67, these associated springs being equal in number to the number of perforations formed transversely of the strip of tape. The assemblages 55 comprise cartridge-like packages which may be assembled to brackets 71 and 72 mounted in the framework of the reader in any suitable manner to have their upper surfaces so disposed that when the assemblages 55 are attached to the brackets 71 and 72 by machine screws 73 and 74, respectively, the contact springs 59 will be positioned at an angle such that tape feeding through the reader in either direction will engage the ends 61 of the springs to flex them and open the circuit between the common contact member 62 and the precious-metal contacts 60 at all times when imperforate sections of the tape are directly above the ends 61 of the contact springs 59.

The provision of contact assemblages such as the assemblages 55 permit rapid replacement of an assemblage if for any reason such replacement is required due to damage or wear of the parts of the assemblage 55. The contact springs 59 and common contact member 62 of this particular embodiment of the invention may be connected in a circuit such as that shown in FIG. 2 to prevent the accumulation of contaminants at the circuit closing area of the contacts 60.

Although only two embodiments of the invention are shown in the drawings and described in the foregoing specification, it will be understood that the invention is not limited to the specific embodiments described, but is capable of modification and rearrangement and substitution of parts and elements without departing from the spirit of the invention.

What is claimed is:

1. In a reader for perforated tape having tape sensing contacts, a circuit to generate a high current pulse at said contacts for clearing contaminants from the contacts comprising a load resistor connected in series with the contacts, a capacitor and a second resistor connected in series, the capacitor and second resistor being connected in parallel with the contacts and with the load resistor, the second resistor being of substantially lower resistance than the resistance of the load resistor.

2. A reader for perforated tape comprising:
- a tape deck forming a support for the tape;
- a common contact of conductive material positioned beneath the tape deck;
- a ferromagnetic tape lid;
- a permanent magnet which attracts the tape lid onto the tape deck and which urges the tape lid against the tape to confine the tape between tape lid and the tape deck;
- a sensing brush of conductive material and having two ends and biased against the common contact with one end extending beyond the common contact into engagement with the tape whereby a perforation in the tape will permit the brush to touch the common contact intermediate the two ends of the brush and complete an electrical circuit with the common contact.

3. In a reader for perforated tape:
- a tape deck over which the tape moves;
- a tape lid of ferromagnetic material;
- at least one magnet for attracting the ferromagnetic tape lid toward the tape deck to confine the tape between the tape deck and the tape lid.

4. A reader for perforated tape comprising:
- means for supporting the tape for movement in a predetermined path;
- a common contact of conductive material mounted beneath the supporting means;
- a magnetizable tape lid to hold the tape in close proximity to the support means;
- a magnet for attracting the tape lid toward the support means,
- a brush of conductive material having one end biased to engage the tape and to enter perforations in the tape, said brush extending from beneath the common contact to above the support means whereby a mid portion of said brush will engage the common contact upon the brush encountering a perforation in the tape;
- means for directing a current of air from the area where the brush makes contact with the common contact toward the tape-supporting means;
- means for passing current through the brush and the common contact immediately upon the brush contacting the common contact, said current being of substantially larger magnitude than a normal steady state current through the brush while contacting the common contact; and
- means for reducing the current through the brush and common contact to substantially the normal value within a period of time substantially less than the normal contact duration of the brush and common contact.

5. A perforated tape reader including:
- a frame having a surface defining a tape path and having a hole formed in the surface to provide an opening into the tape path;
- a yieldable member fixed to the frame and extending from its point of attachment in cantilever fashion into the hole in the frame;
- a camming surface on the yieldable member positioned in the hole in the frame and in the tape path so that imperforate portions of tape cam the yieldable member out of the tape path thereby bending the yieldable member with respect to the frame, and
- means mounted on the yieldable member for signaling the camming of the yieldable member out of the tape path by an imperforate portion of tape.

6. A reader assemblage for use in perforated tape readers including:
- an insulator block;

a contact member positioned in engagement with the insulator block and extending away from the insulator block in cantilever fashion;

at least one flexible member fixed in the insulator block and extending therefrom in cantilever fashion into engagement with the contact member, and a tape engaging camming member mounted on the flexible member at a point further from the insulating block than the point of engagement of the flexible member with the contact member.

7. A reader assemblage for use in perforated tape readers including:

an insulator block;

a plate member fixed in engagement with the insulator block and extending therefrom in a predetermined direction;

a yieldable tape engaging member fixed to the insulator block and extending therefrom in cantilever fashion in the predetermined direction and terminating in a tape engaging camming surface, and means mounted on the plate member in engagement with the tape engaging member and forming an electrical connection therewith.

8. A subassembly useful in document reading devices comprising:

a block of insulating material;

an electrically conductive document reading member mounted on the block of insulating material and extending therefrom in cantilever fashion to a remote point;

a hump-shaped camming member mounted on the document reading member at the remote point;

an electrical contact member, and means for supporting the contact member on the block of insulating material and for positioning the contact for electrical engagement with the document reading member at a point between the block of insulating material and the remote point.

9. The subassembly according to claim 8 wherein the document reading member is comprised of a spring biased into engagement with the contact member and wherein the camming member is comprised of an inverted U-shaped portion of the spring formed at the end thereof.

10. A document reader comprising:

a frame having a surface defining a document path and having a hole formed in the surface to provide an opening into the document path;

means for advancing a document both forwards and backwards along the document path;

a document sensing member fixed to the frame and extending from its point of attachment into the hole in the frame;

a hump-shaped camming member mounted on the document sensing member in the hole in the frame and having camming surfaces facing both the forward and backward directions of document travel along the path for camming the document sensing member out of the document path regardless of whether the advancing means moves the document forward or backward along the document path, and means on the document sensing member for signaling the camming of the document sensing member out of the document path.

References Cited

UNITED STATES PATENTS

| | | | |
|---|---|---|---|
| 1,626,900 | 5/1927 | Wilde | 235—61.111 |
| 2,265,462 | 12/1941 | Weitmann | 235—61.111 |
| 2,994,476 | 8/1961 | Sinn | 235—61.111 |

THOMAS A. ROBINSON, *Primary Examiner.*